US012604227B2

(12) United States Patent
Kanamarlapudi et al.

(10) Patent No.: US 12,604,227 B2
(45) Date of Patent: Apr. 14, 2026

(54) TECHNIQUES FOR OPPORTUNISTIC CONFIGURATION ADJUSTMENT

(71) Applicant: QUALCOMM Incorporated, San Diego, CA (US)

(72) Inventors: Sitaramanjaneyulu Kanamarlapudi, San Diego, CA (US); Deepak Wadhwa, San Diego, CA (US); Shailesh Maheshwari, San Diego, CA (US); Seshagiri Rao Gorantla, San Diego, CA (US); Soo-Ki Choi, San Diego, CA (US); Balaji Kannan, Hyderabad (IN); Sharda Ranjan, Hyderabad (IN); Gautham Jayaram, San Diego, CA (US); Vishu Kumar, Bengaluru (IN); Vijay Marwah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 416 days.

(21) Appl. No.: 18/001,682

(22) PCT Filed: Sep. 2, 2021

(86) PCT No.: PCT/US2021/071357
§ 371 (c)(1),
(2) Date: Dec. 13, 2022

(87) PCT Pub. No.: WO2022/051766
PCT Pub. Date: Mar. 10, 2022

(65) Prior Publication Data
US 2023/0232265 A1     Jul. 20, 2023

(30) Foreign Application Priority Data
Sep. 3, 2020     (IN) .............................. 202041038000

(51) Int. Cl.
*H04W 24/10* (2009.01)
*H04W 76/28* (2018.01)

(52) U.S. Cl.
CPC ............ *H04W 24/10* (2013.01); *H04W 76/28* (2018.02)

(58) Field of Classification Search
CPC ............................. H04W 24/10; H04W 76/28
See application file for complete search history.

(56) References Cited

U.S. PATENT DOCUMENTS

| | | | | |
|---|---|---|---|---|
| 2012/0190373 A1* | 7/2012 | Tenny | ............... | H04W 56/0015 455/447 |
| 2014/0044046 A1* | 2/2014 | Vangala | ............ | H04W 28/0273 370/328 |

(Continued)

FOREIGN PATENT DOCUMENTS

| | | | | |
|---|---|---|---|---|
| WO | 2019094977 A1 | 5/2019 | | |
| WO | WO-2020122617 A1 * | 6/2020 | ............ | H04W 72/23 |

OTHER PUBLICATIONS

International Search Report and Written Opinion—PCT/US2021/071357—ISA/EPO—Dec. 10, 2021.

(Continued)

*Primary Examiner* — Deepa Belur
(74) *Attorney, Agent, or Firm* — Harrity & Harrity, LLP

(57) ABSTRACT

Various aspects of the present disclosure generally relate to wireless communication. In some aspects, a user equipment (UE) may receive a measurement gap configuration from a base station, wherein the measurement gap configuration includes a tune away period. The UE may determine whether one or more data traffic criteria are satisfied for the tune away period. The UE may disregard the measurement gap configuration based at least in part on the determination of whether the one or more data traffic criteria are satisfied. The UE may remain tuned to the base station during the tune (Continued)

500 → away period based at least in part on the determination of whether the one or more data traffic criteria are satisfied. Numerous other aspects are provided.

30 Claims, 8 Drawing Sheets

(56) References Cited

U.S. PATENT DOCUMENTS

| | | | | |
|---|---|---|---|---|
| 2017/0064761 A1* | 3/2017 | Kumar | .................. | H04W 76/16 |
| 2017/0086100 A1* | 3/2017 | Sagar | .................... | H04W 76/28 |
| 2017/0127329 A1* | 5/2017 | Maheshwari | ......... | H04W 76/15 |
| 2017/0230932 A1* | 8/2017 | Challa | ................... | H04W 68/02 |
| 2018/0027466 A1* | 1/2018 | Trott | .................. | H04W 36/302 |
| | | | | 455/437 |
| 2018/0331705 A1* | 11/2018 | Ghani | ................... | H04W 76/16 |
| 2019/0174341 A1 | 6/2019 | Chincholi et al. | | |
| 2020/0015246 A1 | 1/2020 | Vilaipornsawai et al. | | |
| 2021/0014667 A1* | 1/2021 | Lovlekar | ........... | H04W 52/0216 |
| 2022/0078650 A1* | 3/2022 | Lee | ....................... | H04W 24/08 |
| 2022/0322121 A1* | 10/2022 | Cui | .................. | H04W 74/0833 |

OTHER PUBLICATIONS

Qualcomm Incorporated: "RSTD Measurement Gap for eMTC UE", R4-1804415, 3GPP TSG-RAN WG4 1 Meeting #86bis, Melbourne, Australia, Apr. 16-Apr. 20, 2018, pp. 1-5.

* cited by examiner

510
Determine whether one or more data traffic criteria are satisfied

UE
120

505
Measurement gap configuration

515
Disregard the measurement gap and remain tuned to BS 110

BS(s)
110

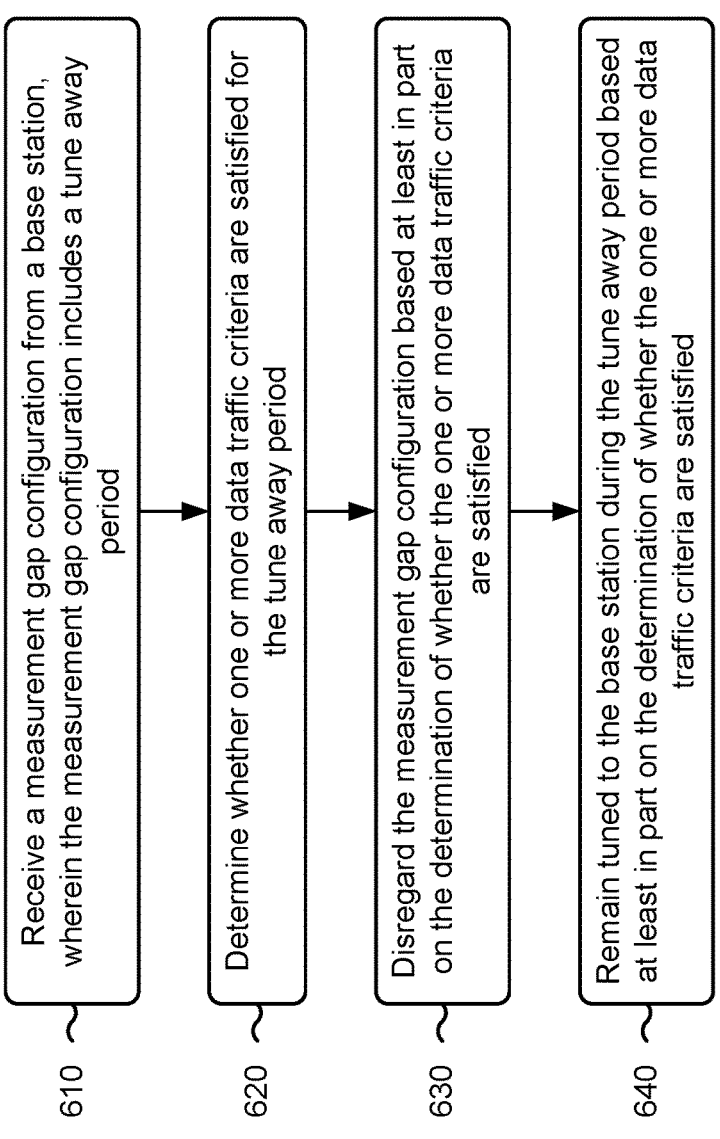

600

610 — Receive a measurement gap configuration from a base station, wherein the measurement gap configuration includes a tune away period 620 — Determine whether one or more data traffic criteria are satisfied for the tune away period 630 — Disregard the measurement gap configuration based at least in part on the determination of whether the one or more data traffic criteria are satisfied 640 — Remain tuned to the base station during the tune away period based at least in part on the determination of whether the one or more data traffic criteria are satisfied

FIG. 6

TECHNIQUES FOR OPPORTUNISTIC CONFIGURATION ADJUSTMENT

CROSS-REFERENCE TO RELATED APPLICATIONS

This Patent Application is a 371 National Phase of PCT Application No. PCT/US2021/071357, filed on Sep. 2, 2021, entitled "TECHNIQUES FOR OPPORTUNISTIC CONFIGURATION ADJUSTMENT," which claims priority to India patent application No. 202041038000, filed on Sep. 3, 2020, entitled "TECHNIQUES FOR OPPORTUNISTIC CONFIGURATION ADJUSTMENT," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for opportunistic configuration adjustment.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a measurement gap configuration from a base station, wherein the measurement gap configuration includes a tune away period; determining whether one or more data traffic criteria are satisfied for the tune away period; disregarding the measurement gap configuration based at least in part on the determination of whether the one or more data traffic criteria are satisfied; and remaining tuned to the base station during the tune away period based at least in part on the determination of whether the one or more data traffic criteria are satisfied.

In some aspects, the one or more data traffic criteria include establishment of a particular type of bearer traffic, the particular type of bearer traffic is based at least in part on at least one of a quality of service parameter or a modem-level configuration. In some aspects, the one or more data traffic criteria include establishment of a notified bearer, the notified bearer is based at least in part on a parameter relating to at least one of an application, an application programming interface, an application processor, or host information. In some aspects, the one or more data traffic criteria include at least one of a packet loss rate or a latency threshold. In some aspects, the one or more data traffic criteria are based at least in part on a retransmission configuration or a measurement configuration.

In some aspects, the tune away period is a measurement gap and the measurement gap configuration is a measurement configuration. In some aspects, the tune away period is a discontinuous reception period and the measurement gap configuration is a discontinuous reception configuration. In some aspects, the one or more data traffic criteria include a call type, wherein the call type is an E-UTRA New Radio Dual Connectivity call type. In some aspects, the one or more data traffic criteria include at least one of a radio condition, a Layer 1 measurement, or a signal threshold. In some aspects, the one or more data traffic criteria include a type of measurement to be performed during the tune away period.

In some aspects, the disregarding of the tune away period includes disregarding performance of a measurement scheduled for the tune away period. In some aspects, the disregarding of the tune away period includes disregarding transition to a discontinuous reception off state for the tune away period. In some aspects, the remaining tuned to the base station includes decoding network traffic associated with the base station for the tune away period. In some aspects, the remaining tuned to the base station includes remaining in a discontinuous reception on state for the tune away period. In some aspects, the method includes operating in accordance with the measurement gap configuration for a next tune away period. In some aspects, the method includes disregarding a set of subsequent tune away periods.

In some aspects, a UE for wireless communication includes a memory; and one or more processors operatively coupled to the memory, the memory and the one or more processors configured to: receive a measurement gap configuration from a base station, wherein the measurement gap configuration includes a tune away period; determine whether one or more data traffic criteria are satisfied for the tune away period; disregard the measurement gap configuration based at least in part on the determination of whether the one or more data traffic criteria are satisfied; and remain tuned to the base station during the tune away period based at least in part on the determination of whether the one or more data traffic criteria are satisfied.

In some aspects, the one or more data traffic criteria include establishment of a particular type of bearer traffic, the particular type of bearer traffic is based at least in part on at least one of a quality of service parameter or a modem-level configuration. In some aspects, the one or more data traffic criteria include establishment of a notified bearer, the notified bearer is based at least in part on a parameter relating to at least one of an application, an application programming interface, an application processor, or host information. In some aspects, the one or more data traffic criteria include at least one of a packet loss rate or a latency threshold. In some aspects, the one or more data traffic criteria are based at least in part on a retransmission configuration or a measurement configuration.

In some aspects, the tune away period is a measurement gap and the measurement gap configuration is a measurement configuration. In some aspects, the tune away period is a discontinuous reception period and the measurement gap configuration is a discontinuous reception configuration. In some aspects, the one or more data traffic criteria include a call type, wherein the call type is an E-UTRA New Radio Dual Connectivity call type. In some aspects, the one or more data traffic criteria include at least one of a radio condition, a Layer 1 measurement, or a signal threshold. In some aspects, the one or more data traffic criteria include a type of measurement to be performed during the tune away period.

In some aspects, the one or more processors, when disregarding the tune away period, are to: disregard performance of a measurement scheduled for the tune away period. In some aspects, the one or more processors, when disregarding the tune away period, are to: disregard transition to a discontinuous reception off state for the tune away period. In some aspects, the one or more processors, when remaining tuned to the base station, are to: decode network traffic associated with the base station for the tune away period. In some aspects, the one or more processors, when remaining tuned to the base station, are to: remain in a discontinuous reception on state for the tune away period. In some aspects, the one or more processors are further configured to: operate in accordance with the measurement gap configuration for a next tune away period. In some aspects, the one or more processors are further configured to: disregard a set of subsequent tune away periods.

In some aspects, a non-transitory computer-readable medium storing a set of instructions for wireless communication includes one or more instructions that, when executed by one or more processors of a user equipment (UE), cause the UE to: receive a measurement gap configuration from a base station, wherein the measurement gap configuration includes a tune away period; determine whether one or more data traffic criteria are satisfied for the tune away period; disregard the measurement gap configuration based at least in part on the determination of whether the one or more data traffic criteria are satisfied; and remain tuned to the base station during the tune away period based at least in part on the determination of whether the one or more data traffic criteria are satisfied.

In some aspects, the one or more data traffic criteria include establishment of a particular type of bearer traffic, the particular type of bearer traffic is based at least in part on at least one of a quality of service parameter or a modem-level configuration. In some aspects, the one or more data traffic criteria include establishment of a notified bearer, the notified bearer is based at least in part on a parameter relating to at least one of an application, an application programming interface, an application processor, or host information. In some aspects, the one or more data traffic criteria include at least one of a packet loss rate or a latency threshold. In some aspects, the one or more data traffic criteria are based at least in part on a retransmission configuration or a measurement configuration.

In some aspects, the tune away period is a measurement gap and the measurement gap configuration is a measurement configuration. In some aspects, the tune away period is a discontinuous reception period and the measurement gap configuration is a discontinuous reception configuration. In some aspects, the one or more data traffic criteria include a call type, wherein the call type is an E-UTRA New Radio Dual Connectivity call type. In some aspects, the one or more data traffic criteria include at least one of a radio condition, a Layer 1 measurement, or a signal threshold. In some aspects, the one or more data traffic criteria include a type of measurement to be performed during the tune away period. In some aspects, the one or more instructions, that cause the UE to disregard the tune away period, cause the UE to: disregard performance of a measurement scheduled for the tune away period.

In some aspects, the one or more instructions, that cause the UE to disregard the tune away period, cause the UE to: disregard transition to a discontinuous reception off state for the tune away period. In some aspects, the one or more instructions, that cause the UE to remain tuned to the base station, cause the UE to: decode network traffic associated with the base station for the tune away period. In some aspects, the one or more instructions, that cause the UE to remain tuned to the base station, cause the UE to: remain in a discontinuous reception on state for the tune away period. In some aspects, the one or more instructions further cause the UE to: operate in accordance with the measurement gap configuration for a next tune away period. In some aspects, the one or more instructions further cause the UE to: disregard a set of subsequent tune away periods.

In some aspects, an apparatus for wireless communication includes means for receiving a measurement gap configuration from a base station, wherein the measurement gap configuration includes a tune away period; means for determining whether one or more data traffic criteria are satisfied for the tune away period; means for disregarding the measurement gap configuration based at least in part on the determination of whether the one or more data traffic criteria are satisfied; and means for remaining tuned to the base station during the tune away period based at least in part on the determination of whether the one or more data traffic criteria are satisfied.

In some aspects, the one or more data traffic criteria include establishment of a particular type of bearer traffic, the particular type of bearer traffic is based at least in part on at least one of a quality of service parameter or a modem-level configuration. In some aspects, the one or more data traffic criteria include establishment of a notified bearer, the notified bearer is based at least in part on a parameter relating to at least one of an application, an application programming interface, an application processor, or host information. In some aspects, the one or more data traffic criteria include at least one of a packet loss rate or a latency threshold. In some aspects, the one or more data traffic criteria are based at least in part on a retransmission configuration or a measurement configuration.

In some aspects, the tune away period is a measurement gap and the measurement gap configuration is a measurement configuration. In some aspects, the tune away period is a discontinuous reception period and the measurement gap configuration is a discontinuous reception configuration. In some aspects, the one or more data traffic criteria include a call type, wherein the call type is an E-UTRA New Radio Dual Connectivity call type. In some aspects, the one or more data traffic criteria include at least one of a radio condition, a Layer 1 measurement, or a signal threshold. In some aspects, the one or more data traffic criteria include a type of measurement to be performed during the tune away period. In some aspects, the means for disregarding of the tune away period includes means for disregarding performance of a measurement scheduled for the tune away period.

In some aspects, the means for disregarding of the tune away period includes means for disregarding transition to a discontinuous reception off state for the tune away period. In some aspects, the means for remaining tuned to the base station includes means for decoding network traffic associated with the base station for the tune away period. In some aspects, the means for remaining tuned to the base station includes means for remaining in a discontinuous reception on state for the tune away period. In some aspects, the apparatus includes means for operating in accordance with the measurement gap configuration for a next tune away period. In some aspects, the apparatus includes means for disregarding a set of subsequent tune away periods.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of discontinuous reception (DRX) configuration, in accordance with the present disclosure.

FIG. 6 is a diagram illustrating an example process associated with opportunistic configuration adjustment, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
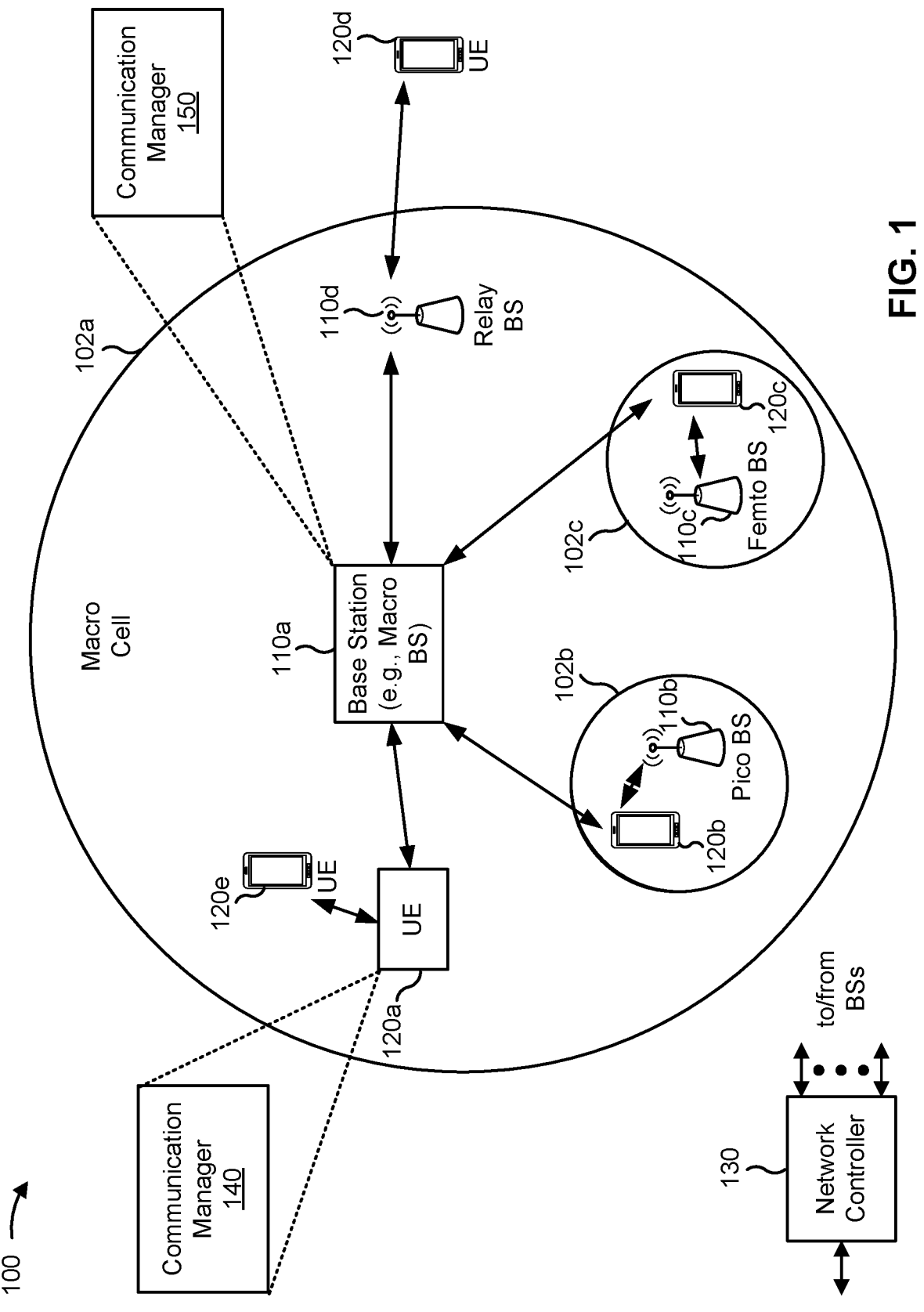
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include midband frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a measurement gap configuration from a base station, wherein the measurement gap configuration includes a tune away period; determine whether one or more data traffic criteria are satisfied for the tune away period; disregard the measurement gap configuration based at least in part on the determination of whether the one or more data traffic criteria are satisfied; and remain tuned to the base station during the tune away period based at least in part on the determination of whether the one or more data traffic criteria are satisfied. Additionally, or alternatively, the communication manager 140 may perform one or more other operations described herein.

In some aspects, the base station 110 may include a communication manager 150. As described in more detail elsewhere herein, the communication manager 150 may provide a measurement gap configuration and communicate with a UE after providing the measurement gap configuration. Additionally, or alternatively, the communication manager 150 may perform one or more other operations described herein.

As indicated above, FIG. 1 is provided as an example. Other examples may differ from what is described with regard to FIG. 1.

Figure 2:
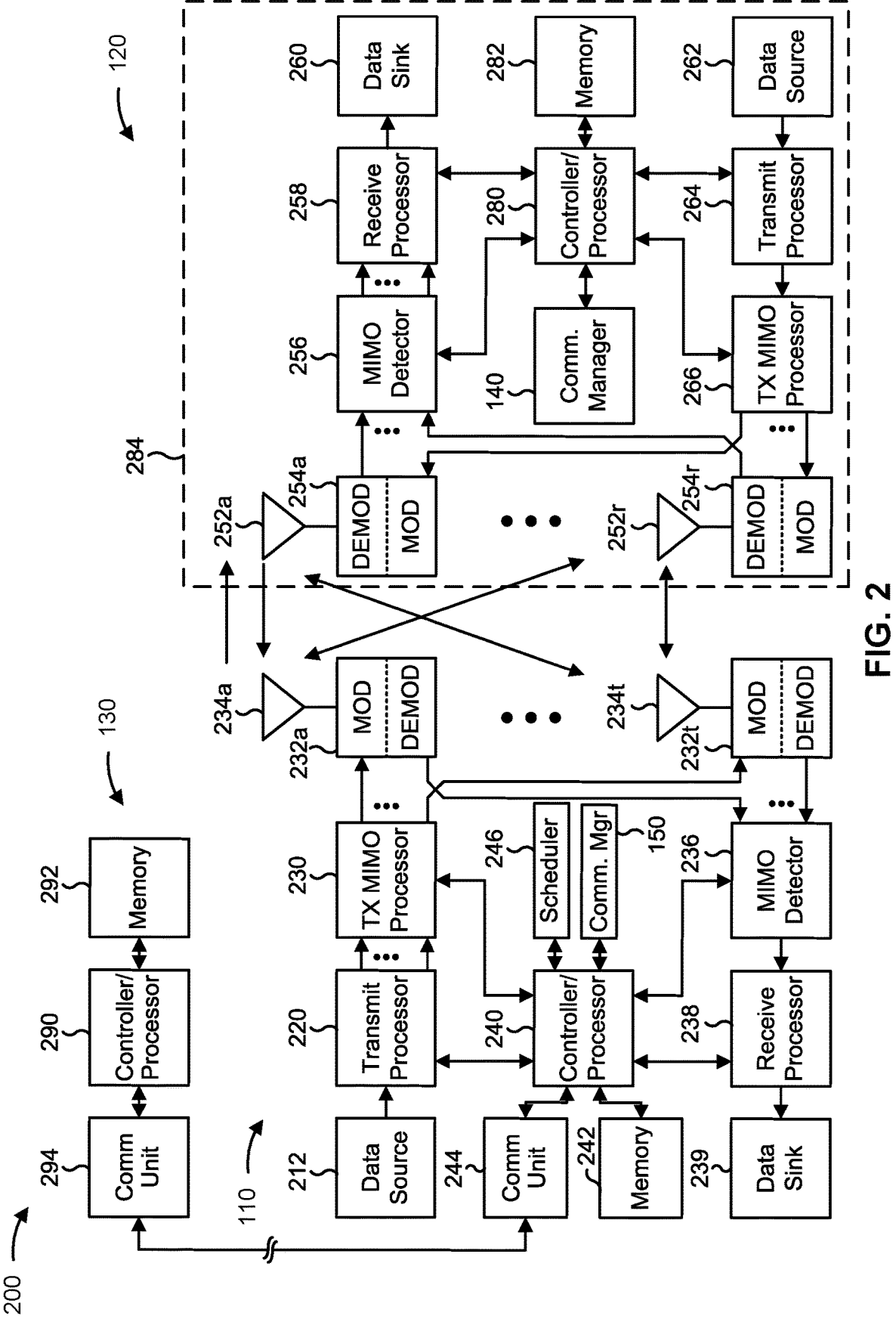
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with opportunistic configuration adjustment, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some examples, executing instructions may include running the instructions, converting the instructions, compiling the instructions, and/or interpreting the instructions, among other examples.

In some aspects, UE 120 may include means for receiving a measurement gap configuration from a base station, wherein the measurement gap configuration includes a tune away period, means for determining whether one or more data traffic criteria are satisfied for the tune away period, means for disregarding the measurement gap configuration based at least in part on the determination of whether the one or more data traffic criteria are satisfied, means for remaining tuned to the base station during the tune away period based at least in part on the determination of whether the one or more data traffic criteria are satisfied, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
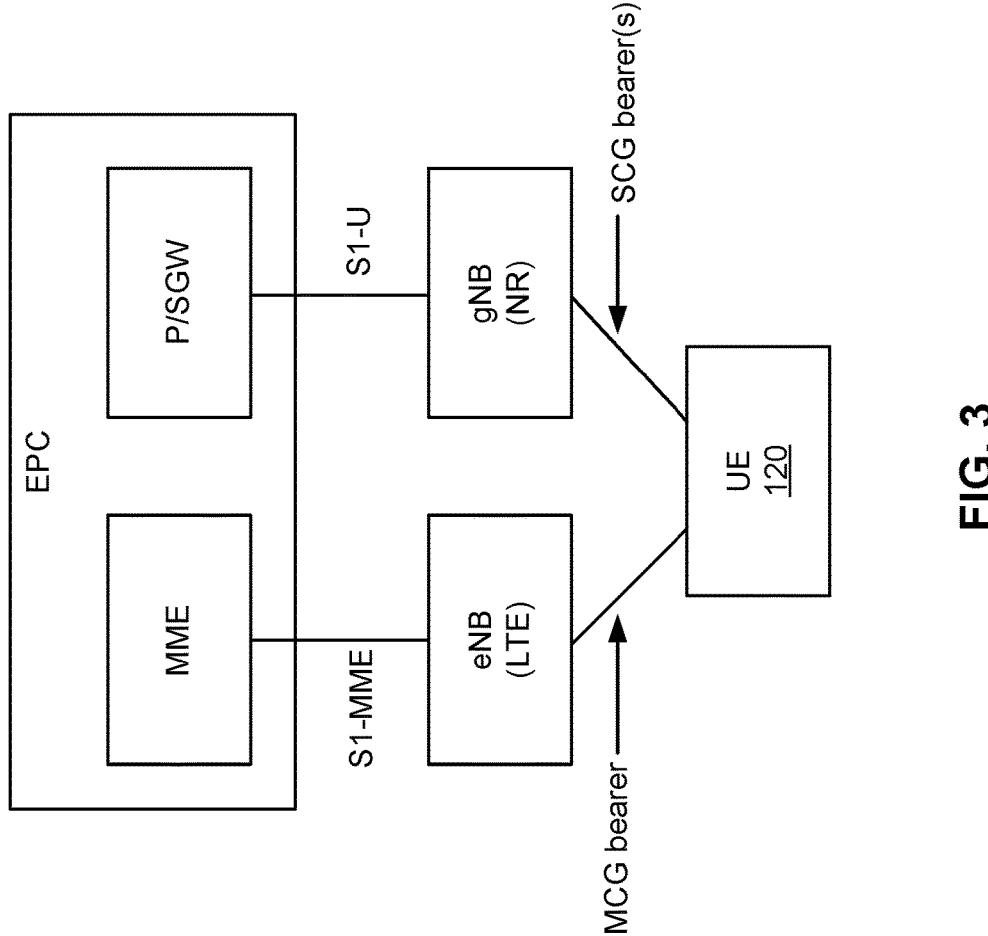
FIG. 3 is a diagram illustrating an example of dual connectivity, in accordance with the present disclosure.

FIG. 3 is a diagram illustrating an example 300 of dual connectivity, in accordance with various aspects of the present disclosure. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., (e.g., where the MCG is associated with a first RAT and the SCG is associated with one of the first RAT or a second RAT). The ENDC mode is sometimes referred to as an NR or 5G non-standalone (NSA) mode. Thus, as used herein, a dual connectivity mode may refer to an ENDC mode, a NEDC mode, an NRDC mode, and/or another type of dual connectivity mode.

As shown in FIG. 3, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or the like. In FIG. 3, the PGW and the SGW are shown collectively as P/SGW. The eNB and the gNB may be co-located at the same base station 110. The eNB and the gNB may be included in different base stations 110 (e.g., may not be co-located).

As further shown in FIG. 3, a wireless network that permits operation in a 5G NSA mode may permit such operations using a master cell group (MCG) for a first RAT (e.g., an LTE RAT, a 4G RAT, and/or the like) and a secondary cell group (SCG) for a second RAT (e.g., an NR RAT, a 5G RAT, and/or the like). In this case, the UE 120 may communicate with the eNB via the MCG, and may communicate with the gNB via the SCG. The MCG may anchor a network connection between the UE 120 and the 4G/LTE core network (e.g., for mobility, coverage, control plane information, and/or the like), and the SCG may be added as additional carriers to increase throughput (e.g., for data traffic, user plane information, and/or the like). The gNB and the eNB may not transfer user plane information between one another. A UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). The MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs), signaling radio bearers (SRBs), and/or the like). For example, the UE 120 may transmit or receive data via the MCG and/or the SCG using one or more DRBs. Similarly, the UE 120 may transmit or receive control information (e.g., radio resource control (RRC) information, measurement reports, and/or the like) using one or more SRBs. A radio bearer may be dedicated to a specific cell group (e.g., a radio bearer may be an MCG bearer, an SCG bearer, and/or the like). A radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). A DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 3 is provided as an example. Other examples may differ from what is described with respect to FIG. 3.

Figure 4:
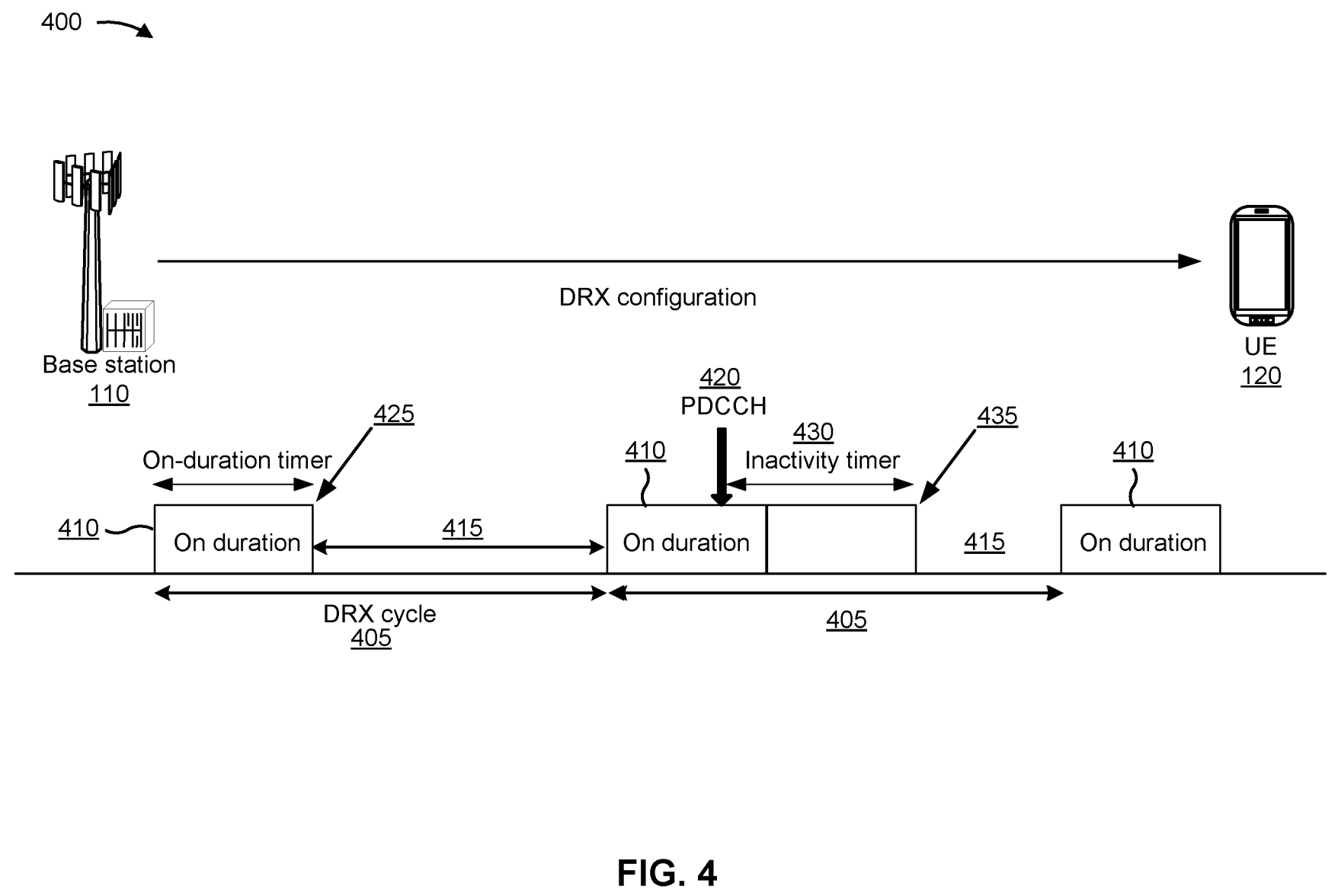

FIG. 4 is a diagram illustrating an example 400 of a discontinuous reception (DRX) configuration, in accordance with various aspects of the present disclosure.

As shown in FIG. 4, a base station 110 may transmit a DRX configuration to a UE 120 to configure a DRX cycle 405 for the UE 120. A DRX cycle 405 may include a DRX on duration 410 (e.g., during which a UE 120 is awake or in an active state) and an opportunity to enter a DRX sleep state 415. As used herein, the time during which the UE 120 is configured to be in an active state during the DRX on duration 410 may be referred to as an active time, and the time during which the UE 120 is configured to be in the DRX sleep state 415 may be referred to as an inactive time. As described below, the UE 120 may monitor a physical downlink control channel (PDCCH) during the active time, and may refrain from monitoring the PDCCH during the inactive time.

During the DRX on duration 410 (e.g., the active time), the UE 120 may monitor a downlink control channel (e.g., a PDCCH), as shown by reference number 420. For example, the UE 120 may monitor the PDCCH for downlink control information (DCI) pertaining to the UE 120. If the UE 120 does not detect and/or successfully decode any PDCCH communications intended for the UE 120 during the DRX on duration 410, then the UE 120 may enter the sleep state 415 (e.g., for the inactive time) at the end of the DRX on duration 410, as shown by reference number 425. In this way, the UE 120 may conserve battery power and reduce power consumption. As shown, the DRX cycle 405 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 430 (e.g., which may extend the active time). The UE 120 may start the DRX inactivity timer 430 at a time at which the PDCCH communication is received (e.g., in a transmission time interval (TTI) in which the PDCCH communication is received, such as a slot, a subframe, and/or the like). The UE 120 may remain in the active state until the DRX inactivity timer 430 expires, at which time the UE 120 may enter the sleep state 415 (e.g., for the inactive time), as shown by reference number 435. During the duration of the DRX inactivity timer 430, the UE 120 may continue to monitor for PDCCH communications, may obtain a downlink data communication (e.g., on a downlink data channel, such as a physical downlink shared channel (PDSCH)) scheduled by the PDCCH communication, may prepare and/or transmit an uplink communication (e.g., on a physical uplink shared channel (PUSCH)) scheduled by the PDCCH communication, and/or the like. The UE 120 may restart the DRX inactivity timer 430 after each detection of a PDCCH communication for the UE 120 for an initial transmission (e.g., but not for a retransmission). By operating in this manner, the UE 120 may conserve battery power and reduce power consumption by entering the sleep state 415.

As indicated above, FIG. 4 is provided as an example. Other examples may differ from what is described with respect to FIG. 4.

In a self-organizing network (SON), a UE may perform measurements, such as automatic neighbor relation (ANR) measurements among others, to enable self-configuration by the network. When performing ANR measurements and reporting, a UE may identify one or more cells that are not included in a neighbor list and report the one or more cells to a BS to enable the BS to configure communication parameters, such as beam parameters or scheduling parameters, among others. The UE may receive information identifying the neighbor list in a system information block (SIB) transmission from the BS, such as, in LTE, a SIB type 4 (SIB4) for intra-frequency cells or a SIB type 5 (SIB5) for inter-frequency cells. Other SIBs or message types may be used for other RATs.

The UE may perform the ANR measurements during a configured measurement gap. The BS may provide information identifying a measurement gap configuration to configure the measurement gap. The measurement gap configuration may define parameters of the measurement gap, such as a length of the measurement gap or a periodicity of the measurement gap, among other examples. During a configured measurement gap, the UE may tune away from a current RAT cell (e.g., a RAT cell that the UE is using for communication) and attempt to measure other RAT cells. In this case, the UE may be unable to decode any communications received on the current RAT cell during the measurement gap.

Although the UE may have procedures for recovering dropped communications, such as layer 2 (L2) recovery procedures or upper layer recovery procedures, among other examples, such recovery procedures may utilize excessive radio resources, errors in reordering window management for link layer protocols, or increased latency (e.g., from timer-based buffering of link layer data before forwarding subsequent packets), among other examples. For example, with regard to streaming video communication, dropped communications associated with measurement gaps may result in lost packets with later recovery (e.g., which may result in latency) and flushed packets (e.g., which may result in packet loss), thereby causing accompanying jitter and video errors in the streaming video communication. Accordingly, the BS may avoid transmitting any communications to the UE during the measurement gap to avoid dropped communications.

However, with increasingly complex network deployments, such as EN-DC networks, as described above, among other examples, some BSs may inadvertently transmit information to a UE during a measurement gap. For example, errors in X2 interface coordination may result in some BSs having incorrect or incomplete information regarding configured measurement gaps for UEs communicating therewith, which may result in the BSs transmitting information during the measurement gaps and failing to transmit information to the UEs during non-measurement gap periods.

Some aspects described herein enable opportunistic configuration adjustment. For example, a UE may opportunistically disregard a measurement gap and continue with tuning to and decoding information from a BS. In this case, the UE may determine whether to disregard the measurement gap based at least in part on satisfaction of one or more data traffic criteria, such as a type of bearer traffic the UE is receiving, a packet loss rate or latency threshold, or a call type the UE is performing, among other examples. Based at least in part on determining to disregard the measurement gap, the UE may continue, during a scheduled measurement gap, attempting to decode received information from a BS, thereby avoiding dropped communications if the BS inadvertently violates the scheduled measurement gap by continuing to communicate with the UE. In this way, the UE avoids dropped communications, excess latency, excess packet loss, or communication interruption (e.g., excess jitter on streaming video), among other examples.

Figure 5:
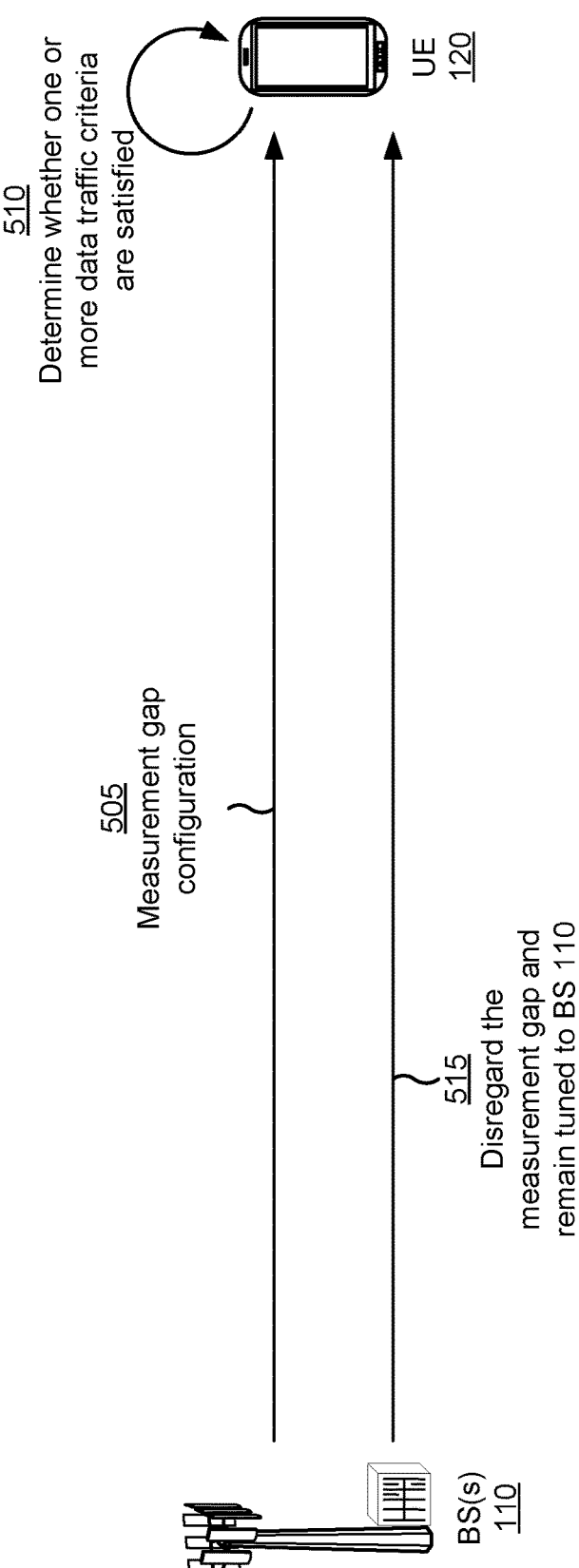
FIG. 5 is a diagram illustrating an example associated with opportunistic configuration adjustment, in accordance with the present disclosure.

FIG. 5 is a diagram illustrating an example 500 associated with opportunistic configuration adjustment, in accordance with various aspects of the present disclosure. As shown in FIG. 5, example 500 includes communication between one or more base stations 110 and a UE 120. A base station 110 and UE 120 may be included in a wireless network, such as wireless network 100. A base station 110 and UE 120 may communicate on a wireless access link, which may include an uplink and a downlink. The one or more base stations 110 may communicate on a backhaul interface, such as an X2 interface.

As further shown in FIG. 5, and by reference number 505, UE 120 may receive information identifying a measurement gap configuration. For example, UE 120 may receive information identifying a length of a measurement gap, a periodicity of a measurement gap, or a start of a measurement gap, among other examples.

As further shown in FIG. 5, and by reference number 510, UE 120 may determine whether one or more data traffic criteria are satisfied. For example, UE 120 may determine that data traffic between UE 120 and base station 110 is associated with a particular type of bearer traffic (e.g., transport control protocol (TCP) traffic or streaming video traffic). for which UE 120 is to disregard the measurement gap. In this case, UE 120 may determine that the particular type of bearer traffic is one for which UE 120 is to disregard the measurement gap based at least in part on a quality of service (QoS) requirement of a bearer supporting the particular type of bearer traffic. Additionally, or alternatively, UE 120 may receive a notification from a modem of UE 120 that the bearer is associated with the particular type of bearer traffic.

In some aspects, UE 120 may determine whether the one or more data traffic criteria are satisfied based at least in part on determining that the data traffic is associated with a notified type of bearer traffic. For example, UE 120 may determine that the bearer traffic is to override the measurement gap configuration based at least in part on an application, an application programming interface (API), an application processor, or host information, among other examples associated with the bearer traffic. Additionally, or alternatively, UE 120 may determine that the one or more data traffic criteria are satisfied based at least in part on satisfaction of a threshold. For example, UE 120 may determine that a packet loss rate, a latency, or a number of retransmissions (to recover lost data), a packet delay budget (PDB), a packet error rate (PER), a bit error rate (BER), a block error rate (BLER), a maximum bit rate (MBR), an average bit rate, a minimum bit rate, among other examples satisfies a threshold.

In some aspects, UE 120 may determine whether the one or more data traffic criteria are satisfied based at least in part on a communication type. For example, when UE 120 is operating in an EN-DC alone communication type, UE 120 may determine to disregard the measurement gap. Additionally, or alternatively, UE 120 may determine to disregard the measurement gap based at least in part on a radio condition, such as a layer 1 (L1) measurement or a signal threshold (e.g., a reference signal received power (RSRP) or a reference signal received quality (RSRQ)), among other examples, As further shown in FIG. 5, and by reference number 515, UE 120 may disregard the measurement gap and remain tuned to base station 110. For example, when UE 120 determines that the one or more data traffic criteria are satisfied, UE 120 may disregard a scheduled measurement gap, remained tuned to base station 110, and decode communications from base station 110 if base station 110 transmits data during the scheduled measurement gap. Additionally, or alternatively, when UE 120 determines that the one or more data traffic criteria are not satisfied, UE 120 may perform one or more measurements, such as an ANR measurement, a measurement associated with a report (e.g., A1, A2, B1, etc.) among other examples, during the measurement gap.

In some aspects, UE 120 may determine to skip the measurements in accordance with a skipping pattern. For example, UE 120 may skip a first subset of measurement to allow for decoding during the measurement gap, but perform a second subset of measurements (e.g., based at least in part on respective types or priorities of the first and second subsets of measurements). In some aspects, UE 120 may disregard a DRX configuration. For example, UE 120 may determine to avoid transitioning between DRX modes in accordance with the measurement gap configuration based at least in part on determining to disregard the measurement gap.

In some aspects, UE 120 may disregard a subsequent measurement gap. For example, when UE 120 determines that the one or more data traffic criteria are satisfied, UE 120 may determine to disregard a plurality of measurement gaps, such as a threshold number of measurement gaps or all subsequent measurement gaps (e.g., until a new measurement gap configuration is received). Additionally, or alternatively, UE 120 may determine to disregard a single measurement gap and may, for a subsequent measurement gap, perform another determination regarding whether the one or more data traffic criteria are satisfied.

As indicated above, FIG. 5 is provided as an example. Other examples may differ from what is described with respect to FIG. 5.

FIG. 6 is a diagram illustrating an example process 600 performed, for example, by a user equipment (UE), in accordance with various aspects of the present disclosure. Example process 600 is an example where the UE (e.g., UE 120) performs operations associated with techniques for opportunistic configuration adjustment.

As shown in FIG. 6, in some aspects, process 600 may include receiving a measurement gap configuration from a base station, wherein the measurement gap configuration includes a tune away period (block 610). For example, the UE (e.g., using reception component 702, depicted in FIG. 7) may receive a measurement gap configuration from a base station, wherein the measurement gap configuration includes a tune away period, as described above.

As further shown in FIG. 6, in some aspects, process 600 may include determining whether one or more data traffic criteria are satisfied for the tune away period (block 620). For example, the UE (e.g., using determination component 708, depicted in FIG. 7) may determine whether one or more data traffic criteria are satisfied for the tune away period, as described above.

As further shown in FIG. 6, in some aspects, process 600 may include disregarding the measurement gap configuration based at least in part on the determination of whether the one or more data traffic criteria are satisfied (block 630). For example, the UE (e.g., using measurement control component 710 or decoding control component 712, among other examples, depicted in FIG. 7) may disregard the measurement gap configuration based at least in part on the determination of whether the one or more data traffic criteria are satisfied, as described above.

As further shown in FIG. 6, in some aspects, process 600 may include remaining tuned to the base station during the tune away period based at least in part on the determination of whether the one or more data traffic criteria are satisfied (block 640). For example, the UE (e.g., using measurement control component 710 or decoding control component 712, among other examples, depicted in FIG. 7) may remain tuned to the base station during the tune away period based at least in part on the determination of whether the one or more data traffic criteria are satisfied, as described above.

Process 600 may include additional aspects, such as any single aspect or any combination of aspects described below and/or in connection with one or more other processes described elsewhere herein.

In a first aspect, the one or more data traffic criteria include establishment of a particular type of bearer traffic, wherein the particular type of bearer traffic is based at least in part on at least one of a quality of service parameter or a modem-level configuration.

In a second aspect, alone or in combination with the first aspect, the one or more data traffic criteria include establishment of a notified bearer, wherein the notified bearer is based at least in part on a parameter relating to at least one of an application, an application programming interface, an application processor, or host information.

In a third aspect, alone or in combination with one or more of the first and second aspects, the one or more data traffic criteria include at least one of a packet loss rate or a latency threshold.

In a fourth aspect, alone or in combination with one or more of the first through third aspects, the one or more data traffic criteria are based at least in part on a retransmission configuration or a measurement configuration.

In a fifth aspect, alone or in combination with one or more of the first through fourth aspects, the tune away period is a measurement gap and the measurement gap configuration is a measurement configuration.

In a sixth aspect, alone or in combination with one or more of the first through fifth aspects, the tune away period is a discontinuous reception period and the measurement gap configuration is a discontinuous reception configuration.

In a seventh aspect, alone or in combination with one or more of the first through sixth aspects, the one or more data traffic criteria include a call type, wherein the call type is an E-UTRA New Radio Dual Connectivity call type.

In an eighth aspect, alone or in combination with one or more of the first through seventh aspects, the one or more data traffic criteria include at least one of a radio condition, a Layer 1 measurement, or a signal threshold.

In a ninth aspect, alone or in combination with one or more of the first through eighth aspects, the one or more data traffic criteria include a type of measurement to be performed during the tune away period.

In a tenth aspect, alone or in combination with one or more of the first through ninth aspects, the disregarding of the tune away period comprises disregarding performance of a measurement scheduled for the tune away period.

In an eleventh aspect, alone or in combination with one or more of the first through tenth aspects, the disregarding of the tune away period comprises disregarding transition to a discontinuous reception off state for the tune away period.

In a twelfth aspect, alone or in combination with one or more of the first through eleventh aspects, the remaining tuned to the base station comprises decoding network traffic associated with the base station for the tune away period.

In a thirteenth aspect, alone or in combination with one or more of the first through twelfth aspects, the remaining tuned to the base station comprises remaining in a discontinuous reception on state for the tune away period.

In a fourteenth aspect, alone or in combination with one or more of the first through thirteenth aspects, process 600 includes operating in accordance with the measurement gap configuration for a next tune away period.

In a fifteenth aspect, alone or in combination with one or more of the first through fourteenth aspects, process 600 includes disregarding a set of subsequent tune away periods.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
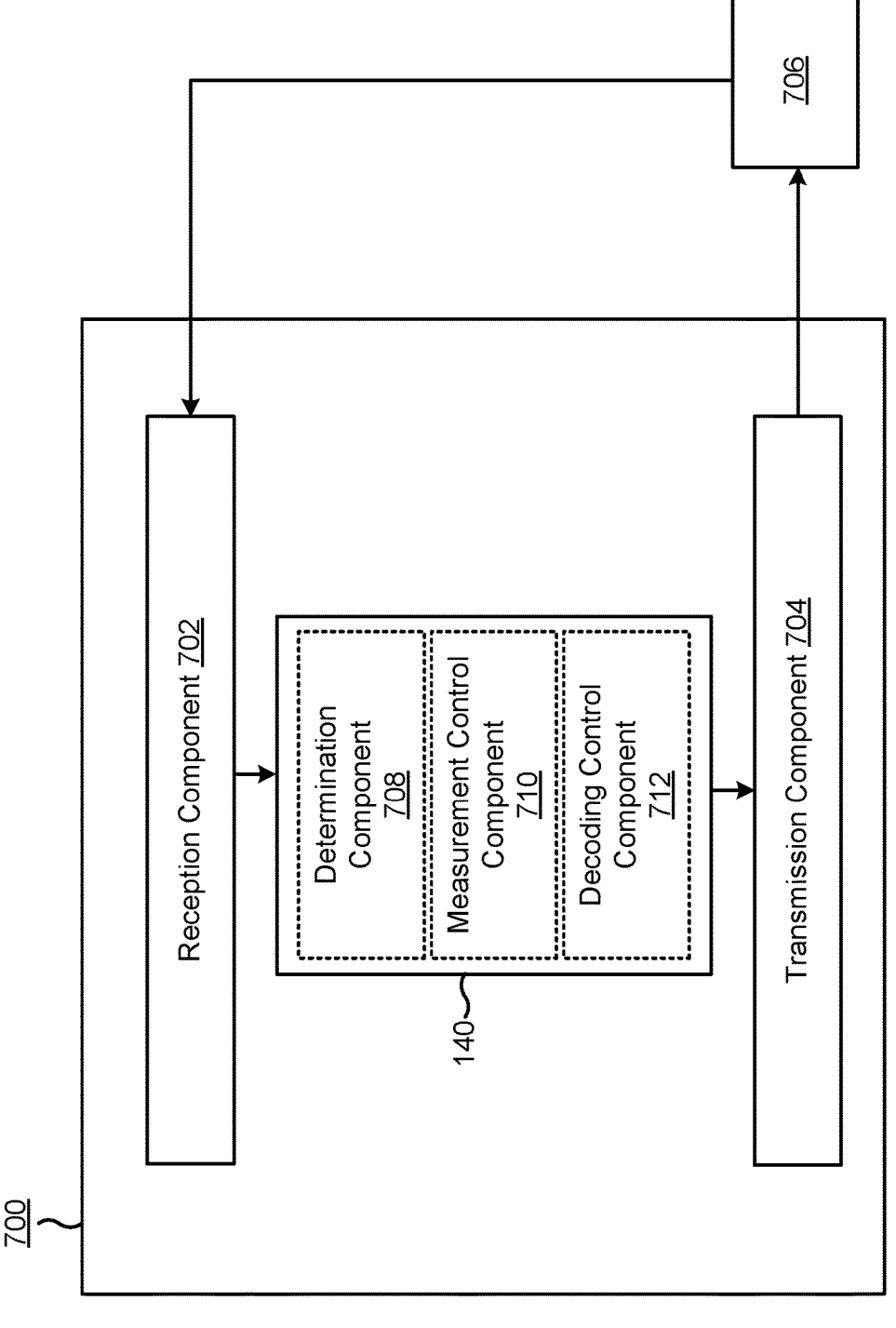
FIGS. 7-8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a determination component 708, a measurement control component 710, or a decoding control component 712, among other examples.

In some aspects, the apparatus 700 may be configured to perform one or more operations described herein in connection with FIG. 5. Additionally or alternatively, the apparatus 700 may be configured to perform one or more processes described herein, such as process 600 of FIG. 6, among other examples. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be collocated with the reception component 702 in a transceiver.

The reception component 702 may receive a measurement gap configuration from a base station, wherein the measurement gap configuration includes a tune away period. The determination component 708 may determine whether one or more data traffic criteria are satisfied for the tune away period. In some aspects, the determination component 708 may include a receive processor, a transmit processor, a controller/processor, a memory, or a combination thereof, of the UE described above in connection with FIG. 2. The measurement control component 710 or the decoding control component 712 may disregard the measurement gap configuration based at least in part on the determination of whether the one or more data traffic criteria are satisfied, and may cause the apparatus 700 to remain tuned to the base station during the tune away period based at least in part on the determination of whether the one or more data traffic criteria are satisfied. In some aspects, The measurement control component 710 or the decoding control component 712 may each include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
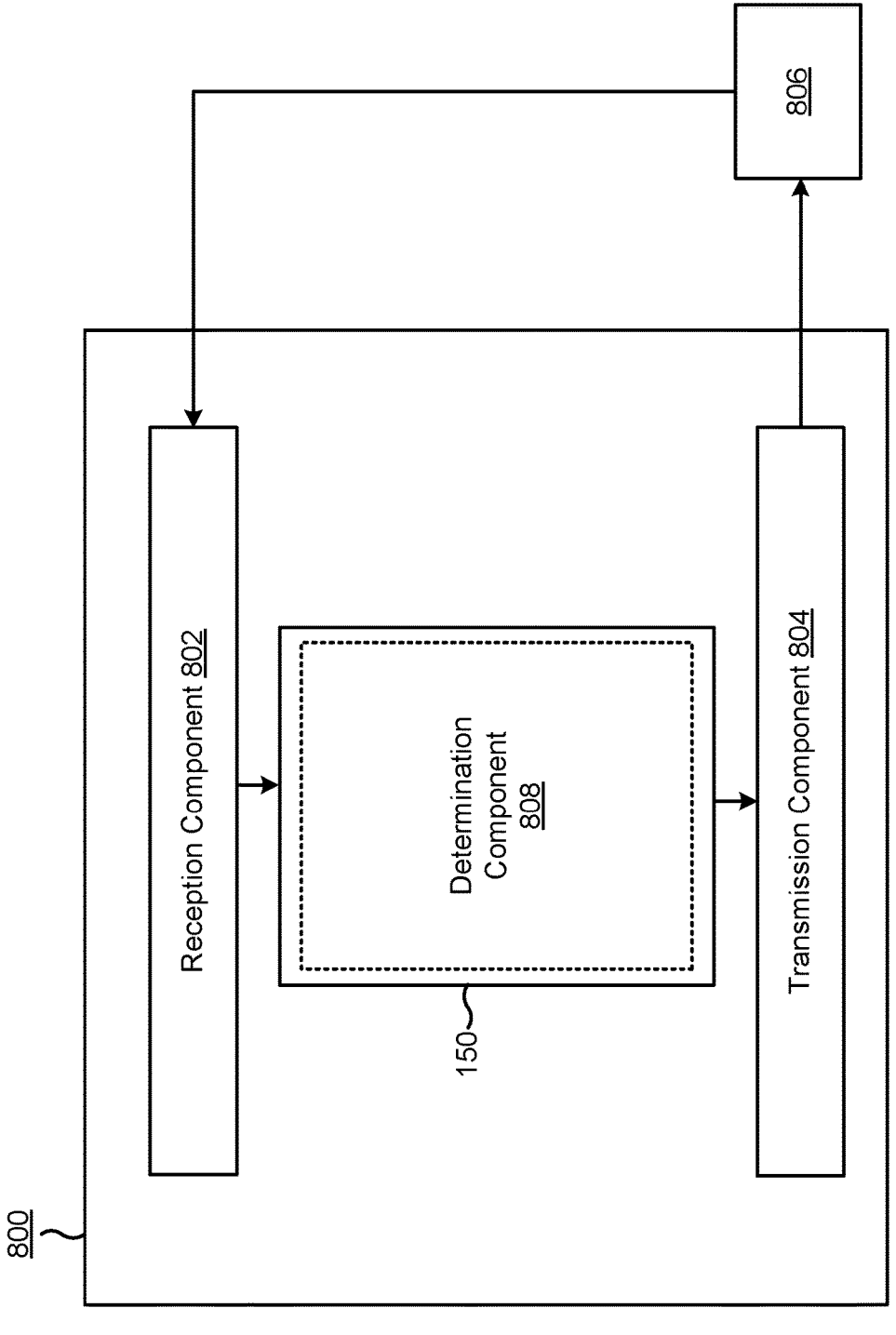

FIG. 8 is a block diagram of an example apparatus 800 for wireless communication. The apparatus 800 may be a BS, or a BS may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808, among other examples.

In some aspects, the apparatus 800 may be configured to perform one or more operations described herein in connection with FIG. 5. Additionally or alternatively, the apparatus 800 may be configured to perform operations associated with one or more processes described herein, such as process 600, among other examples. In some aspects, the apparatus 800 and/or one or more components shown in FIG. 8 may include one or more components of the BS described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the BS described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the BS described above in connection with FIG. 2. In some aspects, the transmission component 804 may be collocated with the reception component 802 in a transceiver.

The transmission component 804 may transmit information identifying a measurement gap configuration from a base station, wherein the measurement gap configuration includes a tune away period. The transmission component 804 may transmit data to apparatus 806 during a measurement gap and apparatus 806 may remain tuned to apparatus 800 during the measurement gap to avoid dropped communications. The determination component 808 may determine the measurement gap configuration or a set of SON parameters, among other examples. In some aspects, the determination component 808 may include a receive processor, a transmit processor, a controller/processor, a memory, or a combination thereof, of the BS described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a measurement gap configuration from a base station, wherein the measurement gap configuration includes a tune away period; determining whether one or more data traffic criteria are satisfied for the tune away period; disregarding the measurement gap configuration based at least in part on the determination of whether the one or more data traffic criteria are satisfied; and remaining tuned to the base station during the tune away period based at least in part on the determination of whether the one or more data traffic criteria are satisfied.

Aspect 2: The method of Aspect 1, wherein the one or more data traffic criteria include establishment of a particular type of bearer traffic, wherein the particular type of bearer traffic is based at least in part on at least one of a quality of service parameter or a modem-level configuration.

Aspect 3: The method of any of Aspects 1 to 2, wherein the one or more data traffic criteria include establishment of a notified bearer, wherein the notified bearer is based at least in part on a parameter relating to at least one of an application, an application programming interface, an application processor, or host information.

Aspect 4: The method of any of Aspects 1 to 3, wherein the one or more data traffic criteria include at least one of a packet loss rate or a latency threshold.

Aspect 5: The method of Aspect 4, wherein the one or more data traffic criteria are based at least in part on a retransmission configuration or a measurement configuration.

Aspect 6: The method of any of Aspects 1 to 5, wherein the tune away period is a measurement gap and the measurement gap configuration is a measurement configuration.

Aspect 7: The method of any of Aspects 1 to 6, wherein the tune away period is a discontinuous reception period and the measurement gap configuration is a discontinuous reception configuration.

Aspect 8: The method of any of Aspects 1 to 7, wherein the one or more data traffic criteria include a call type, wherein the call type is an E-UTRA New Radio Dual Connectivity call type.

Aspect 9: The method of any of Aspects 1 to 8, wherein the one or more data traffic criteria include at least one of a radio condition, a Layer 1 measurement, or a signal threshold.

Aspect 10: The method of any of Aspects 1 to 9, wherein the one or more data traffic criteria include a type of measurement to be performed during the tune away period.

Aspect 11: The method of any of Aspects 1 to 10, wherein the disregarding of the tune away period comprises: disregarding performance of a measurement scheduled for the tune away period.

Aspect 12: The method of any of Aspects 1 to 11, wherein the disregarding of the tune away period comprises: disregarding transition to a discontinuous reception off state for the tune away period.

Aspect 13: The method of any of Aspects 1 to 12, wherein the remaining tuned to the base station comprises: decoding network traffic associated with the base station for the tune away period.

Aspect 14: The method of any of Aspects 1 to 13, wherein the remaining tuned to the base station comprises: remaining in a discontinuous reception on state for the tune away period.

Aspect 15: The method of any of Aspects 1 to 14, further comprising: operating in accordance with the measurement gap configuration for a next tune away period.

Aspect 16: The method of any of Aspects 1 to 15, further comprising: disregarding a set of subsequent tune away periods.

Aspect 17: An apparatus for wireless communication at a device, comprising a processor; memory coupled with the processor; and instructions stored in the memory and executable by the processor to cause the apparatus to perform the method of one or more of Aspects 1-16.

Aspect 18: A device for wireless communication, comprising a memory and one or more processors coupled to the memory, the one or more processors configured to perform the method of one or more of Aspects 1-16.

Aspect 19: An apparatus for wireless communication, comprising at least one means for performing the method of one or more of Aspects 1-16.

Aspect 20: A non-transitory computer-readable medium storing code for wireless communication, the code comprising instructions executable by a processor to perform the method of one or more of Aspects 1-16.

Aspect 21: A non-transitory computer-readable medium storing a set of instructions for wireless communication, the set of instructions comprising one or more instructions that, when executed by one or more processors of a device, cause the device to perform the method of one or more of Aspects 1-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors operatively coupled to the memory, the one or more processors configured to cause the UE to:

receive a measurement gap configuration from a base station, wherein the measurement gap configuration includes a plurality of tune away periods;

determine a measurement skipping pattern based at least in part on a determination that one or more data traffic criteria are satisfied, wherein the measurement skipping pattern indicates a first subset of tune away periods, of the plurality of tune away periods, during which the measurement gap configuration is to be disregarded, and a second subset of tune away periods, of the plurality of tune away periods, during which the measurement gap configuration is not to be disregarded;

remain tuned to the base station, and disregard the measurement gap configuration, during the first subset of tune away periods, based at least in part on the determination that the one or more data traffic criteria are satisfied; and tune away from the base station to perform one or more measurements during the second subset of tune away periods.

2. The UE of claim 1, wherein the one or more data traffic criteria include establishment of a particular type of bearer traffic, wherein the particular type of bearer traffic is based at least in part on at least one of a quality-of-service parameter or a modem-level configuration.

3. The UE of claim 1, wherein the one or more data traffic criteria include establishment of a notified bearer, wherein the notified bearer is based at least in part on a parameter relating to at least one of an application, an application programming interface, an application processor, or host information.

4. The UE of claim 1, wherein the one or more data traffic criteria further include a latency threshold.

5. The UE of claim 4, wherein the one or more data traffic criteria are based at least in part on a retransmission configuration or a measurement configuration.

6. The UE of claim 1, wherein the plurality of tune away periods are a plurality of measurement gaps and the measurement gap configuration is a measurement configuration.

7. The UE of claim 1, wherein the plurality of tune away periods are a plurality of discontinuous reception periods and the measurement gap configuration is a discontinuous reception configuration.

8. The UE of claim 1, wherein the one or more data traffic criteria include a call type, wherein the call type is an E-UTRA New Radio Dual Connectivity call type.

9. The UE of claim 1, wherein the one or more data traffic criteria include at least one of a radio condition, a Layer 1 measurement, or a signal threshold.

10. The UE of claim 1, wherein the one or more data traffic criteria include a type of measurement to be performed during the plurality of tune away periods.

11. The UE of claim 1, wherein the one or more processors are configured to cause the UE to remain tuned during the first subset of tune away periods by being configured to cause the UE to:

disregard performance of a measurement scheduled for the first subset of tune away periods.

12. The UE of claim 1, wherein the one or more processors are configured to cause the UE to remain tuned during the first subset of tune away periods by being configured to cause the UE to:

disregard transition to a discontinuous reception off state for the first subset of tune away periods.

13. The UE of claim 1, wherein the one or more processors are configured to cause the UE to remain tuned to the base station by being configured to cause the UE to:

decode network traffic associated with the base station for the first subset of tune away periods.

14. The UE of claim 1, wherein the one or more processors are configured to cause the UE to remain tuned to the base station by being configured to cause the UE to:

remain in a discontinuous reception on state for the first subset of tune away periods.

15. The UE of claim 1, wherein the one or more processors are further configured to cause the UE to:

operate in accordance with the measurement gap configuration for the second subset of tune away periods.

16. The UE of claim 1, wherein the one or more processors are further configured to cause the UE to:

disregard a set of subsequent tune away periods.

17. A method of wireless communication performed by a user equipment (UE), comprising:

receiving a measurement gap configuration from a base station, wherein the measurement gap configuration includes a plurality of tune away periods;

determining a measurement skipping pattern based at least in part on a determination that one or more data traffic criteria are satisfied, wherein the measurement skipping pattern indicates a first subset of tune away periods, of the plurality of tune away periods, during which the measurement gap configuration is to be disregarded, and a second subset of tune away periods, of the plurality of tune away periods, during which the measurement gap configuration is not to be disregarded;

remaining tuned to the base station, and disregarding the measurement gap configuration, during the first subset of tune away periods, based at least in part on the determination that the one or more data traffic criteria are satisfied; and tuning away from the base station to perform one or more measurements during the second subset of tune away periods.

18. The method of claim 17, wherein the one or more data traffic criteria include establishment of a particular type of bearer traffic, wherein the particular type of bearer traffic is based at least in part on at least one of a quality of service parameter or a modem-level configuration.

19. The method of claim 17, wherein the one or more data traffic criteria include establishment of a notified bearer, wherein the notified bearer is based at least in part on a parameter relating to at least one of an application, an application programming interface, an application processor, or host information.

20. The method of claim 17, wherein the one or more data traffic criteria further include a latency threshold.

21. The method of claim 20, wherein the one or more data traffic criteria are based at least in part on a retransmission configuration or a measurement configuration.

22. The method of claim 17, wherein the plurality of tune away periods are a plurality of measurement gaps and the measurement gap configuration is a measurement configuration.

23. The method of claim 17, wherein the plurality of tune away periods are a plurality of discontinuous reception periods and the measurement gap configuration is a discontinuous reception configuration.

24. The method of claim 17, wherein the one or more data traffic criteria include a call type, wherein the call type is an E-UTRA New Radio Dual Connectivity call type.

25. The method of claim 17, wherein the one or more data traffic criteria include at least one of a radio condition, a Layer 1 measurement, or a signal threshold.

26. The method of claim 17, wherein the one or more data traffic criteria include a type of measurement to be performed during the plurality of tune away periods.

27. The method of claim 17, wherein remaining tuned during the first subset of tune away periods comprises:

disregarding performance of a measurement scheduled for the first subset of tune away periods.

28. The method of claim 17, wherein remaining tuned during the first subset of tune away periods comprises:

disregarding transition to a discontinuous reception off state for the first subset of tune away periods.

29. A non-transitory computer-readable medium storing a set of instructions for wireless communication, the set of instructions comprising:

one or more instructions that, when executed by one or more processors of a user equipment (UE), cause the UE to:

receive a measurement gap configuration from a base station, wherein the measurement gap configuration includes a plurality of tune away periods;

determine a measurement skipping pattern based at least in part on a determination that one or more data traffic criteria are satisfied, wherein the measurement skipping pattern indicates a first subset of tune away periods, of the plurality of tune away periods, during which the measurement gap configuration is to be disregarded, and a second subset of tune away periods, of the plurality of tune away periods, during which the measurement gap configuration is not to be disregarded;

remain tuned to the base station, and disregard the measurement gap configuration, during the first subset of tune away periods, based at least in part on the determination that the one or more data traffic criteria are satisfied; and tune away from the base station to perform one or more measurements during the second subset of tune away periods.

30. An apparatus for wireless communication, comprising:

means for receiving a measurement gap configuration from a base station, wherein the measurement gap configuration includes a plurality of tune away periods;

means for determining a measurement skipping pattern based at least in part on a determination that one or more data traffic criteria are satisfied, wherein the measurement skipping pattern indicates a first subset of tune away periods, of the plurality of tune away periods, during which the measurement gap configuration is to be disregarded, and a second subset of tune away periods, of the plurality of tune away periods, during which the measurement gap configuration is not to be disregarded;

means for remaining tuned to the base station, and disregarding the measurement gap configuration, during the first subset of tune away periods, based at least in part on the determination that the one or more data traffic criteria are satisfied; and means for tuning away from the base station to perform one or more measurements during the second subset of tune away periods.

* * * * *